Aug. 12, 1924.
T. HOREMBALA
FLOOR WASHING MACHINE
Filed Oct. 26, 1922
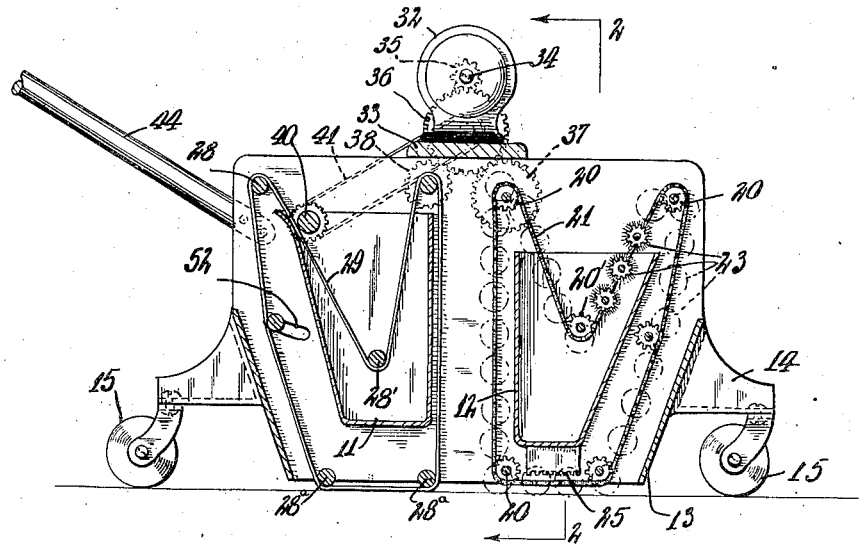
Inventor
Teofil Horembala Patented Aug. 12, 1924.

1,504,476

UNITED STATES PATENT OFFICE.

TEOFIL HOREMBALA, OF WINDSOR, ONTARIO, CANADA.

FLOOR-WASHING MACHINE.

Application filed October 26, 1922. Serial No. 597,083.

*To all whom it may concern:*

Be it known that I, TEOFIL HOREMBALA, a citizen of Poland, residing at Windsor, in the Province of Ontario, and Dominion of Canada, have invented certain new and useful Improvements in Floor-Washing Machines, of which the following is a specification.

This invention relates to a floor washing machine and it has for an object to provide a novel and improved floor washing machine, a further object being to provide a simple type of floor washing machine which both scrubs the floor with a brush and wipes it with a cloth.

For further comprehension of the invention, and of the objects and advantages thereof, reference will be had to the following description and accompanying drawings, and to the appended claims in which the various novel features of the invention are more particularly set forth.

Fig. 1 of the drawings is a vertical sectional view of a floor washing machine constructed according to my invention, this view being taken on the line 1—1 of Fig. 2.

Fig. 2 is a transverse vertical sectional view thereof taken on the line 2—2 of Fig. 1.

Fig. 3 is a detail side elevation, with parts in section, showing a modification.

As here embodied my improved floor washing machine comprises a pair of side plates 10. Carried by these side plates are two open-topped tanks 11 and 12 respectively arranged one in front of the other and which act to unite and brace the side plates 10. At their ends the side plates may be joined by the transverse members 13 to which are fixed brackets 14 carrying castor rollers 15 upon which the machine rests, the bottoms of the tanks being a distance above the bottoms of the rollers.

Each plate 10 has mounted on its forward half a series of sprocket wheels 20 over which are looped a pair of chains 21, these sprocket wheels being so arranged as to carry the chains, during their travel completely around the tank 12, the chains passing forwardly under the tank and rearwardly over the top thereof, passing under other sprocket wheels 20' whereby they are caused to dip into the liquid in the tank.

Extending between and carried by the chains are rotary brushes 23 which are capable of free rotation on the chains. Each of these brushes has fixed thereto a gear pinion 24 adapted to engage a horizontal rack 25 depending from the bottom of the tank 12.

Journaled in and extending between the rear portions of the plates 10 are rollers 28 around which an endless cloth 29 is looped, these rollers being positioned to carry the cloth completely around the tank 11, the cloth passing forwardly under the tank in contact with the floor and rearwardly over the top thereof, passing under another roller 28' in the tank and so dipping into the liquid therein.

The rollers 28 and sprocket wheels 20 are driven by an electric motor 32 mounted on a platform 33 extending between the tops of the side plates 10, this motor having upon one end of its rotor shaft 34 a gear pinion 35 meshing with a large gear 36 which meshes in turn with both of the gears 37 and 38 fixed to the trunnions of one of the sprocket wheels 20 and rollers 28 respectively.

The cloth 29, in its passage through the tank 11, passes close to the rear wall thereof where it is adapted to be engaged by a wringer roller 40 bearing against said wall, this roller being driven by a sprocket chain 41 looped over suitable wheels fixed co-axially to the roller 40 and to the gear 36. Fixed to and projecting rearwardly from the side plates are handles 44.

In the construction shown in Fig. 3 a tensioning roller 50, which bears against the cloth 29, is mounted on the ends of a pair of arms such as 51 adapted to be pivoted as at 52' to the side plates 10, the roller trunnions projecting through arcuate slots such as 52 in the side plates. The rollers 28ª which guide the cloth under the tank 11 are mounted on horizontal bars such as 53 from which rigid rods 54 project upwardly through guides such as 55 carried by the side plates, these rods being united by a yoke 56 at their upper ends and being urged upwardly by springs 57. Bearing downward on this yoke is a cam 58 which is fixed on a shaft 59 extending transversely of the machine, it being understood that there is a cam on each end of the shaft. These cams are connected to the corresponding arms 51 by rigid links 60, while a handle 61 is fixed to shaft 59.

When desired the cloth 29 can be raised from contact with the floor by adjusting handle 61 and lifting the rollers 28ª, the roller 50 being likewise moved and keeping the cloth in contact with said rollers.

Having thus described my invention what I claim as new and desire to protect by Letters Patent of the United States is as follows:

1. In a floor washing machine, an endless cloth, a pair of rollers under which said cloth is adapted to pass in contact with the floor, a tensioning roller engaging said cloth, and a common means for lifting said pair of rollers and swinging said tensioning roller to maintain the tension on the cloth as the said pair of rollers is lifted.

2. In a floor washing machine, an endless cleaning element, a pair of rollers under which said cleaning element is adapted to pass in contact with the floor, a tensioning roller engaging said cleaning element, a pair of hinged arms having said tensioning roller mounted on the free ends thereof, vertically adjustable elements on which said first named rollers are mounted, cams for adjusting said last named elements, and operative connections between said cams and said arms whereby the latter are caused to swing in unison with the movement of the cams to cause the said tensioning roller to move away from the said cleaning element as the said pair of rollers are moved downwardly.

In testimony whereof I have affixed my signature.

TEOFIL HOREMBALA.